US005537415A

United States Patent [19]

Miller et al.

[11] Patent Number: 5,537,415

[45] Date of Patent: Jul. 16, 1996

[54] MULTI-CHANNEL PERSONAL MESSAGING UNIT

[75] Inventors: J. Mark Miller, Kirkland; David W. Voth, Redmond, both of Wash.

[73] Assignee: Microsoft Corporation, Redmond, Wash.

[21] Appl. No.: 336,268

[22] Filed: Nov. 8, 1994

[51] Int. Cl.$^6$ .................. H04Q 7/14; H04J 3/16
[52] U.S. Cl. ............. 370/95.1; 370/85.7; 340/825.44; 455/31.1; 455/74
[58] Field of Search .................. 370/95.1, 95.2, 370/95.3, 11, 38, 39, 85.7; 455/166.2, 74, 31.1, 34.1, 34.2; 379/57, 59, 210–212; 340/825.03, 824.44

[56] References Cited

U.S. PATENT DOCUMENTS

| 5,117,449 | 5/1992 | Metroka | 379/58 |
|---|---|---|---|
| 5,148,473 | 9/1992 | Freeland | 379/59 |
| 5,157,661 | 10/1992 | Kanai | 370/95.1 |
| 5,159,593 | 10/1992 | D'Amico | 370/95.3 |
| 5,175,758 | 12/1992 | Levanto | 379/57 |
| 5,392,452 | 2/1995 | Davis | 455/38.1 |

*Primary Examiner*—Douglas W. Olms
*Assistant Examiner*—Matthew C. Phillips
*Attorney, Agent, or Firm*—Lee & Hayes

[57] ABSTRACT

A mobile communications system in accordance with the invention comprises primary and secondary wireless digital communications networks. The system also comprises a wireless mobile messaging unit. The primary wireless digital communications network operates on a first communications channel using a reserved time slot protocol having discrete time slots reserved for data transmissions to the mobile messaging unit. The secondary wireless digital communications network operates on a second communications channel using a continuous downlink protocol under which data transmissions to the mobile messaging unit might take place at any time. The wireless mobile messaging unit has channel selection logic operatively connected to tune the mobile messaging unit to the first communications channel during the discrete time slots and to the second communications channel during other times. This allows the mobile unit to communicate concurrently with both of the primary and secondary digital communication networks, while requiring only a single radio receiver or transceiver.

61 Claims, 2 Drawing Sheets

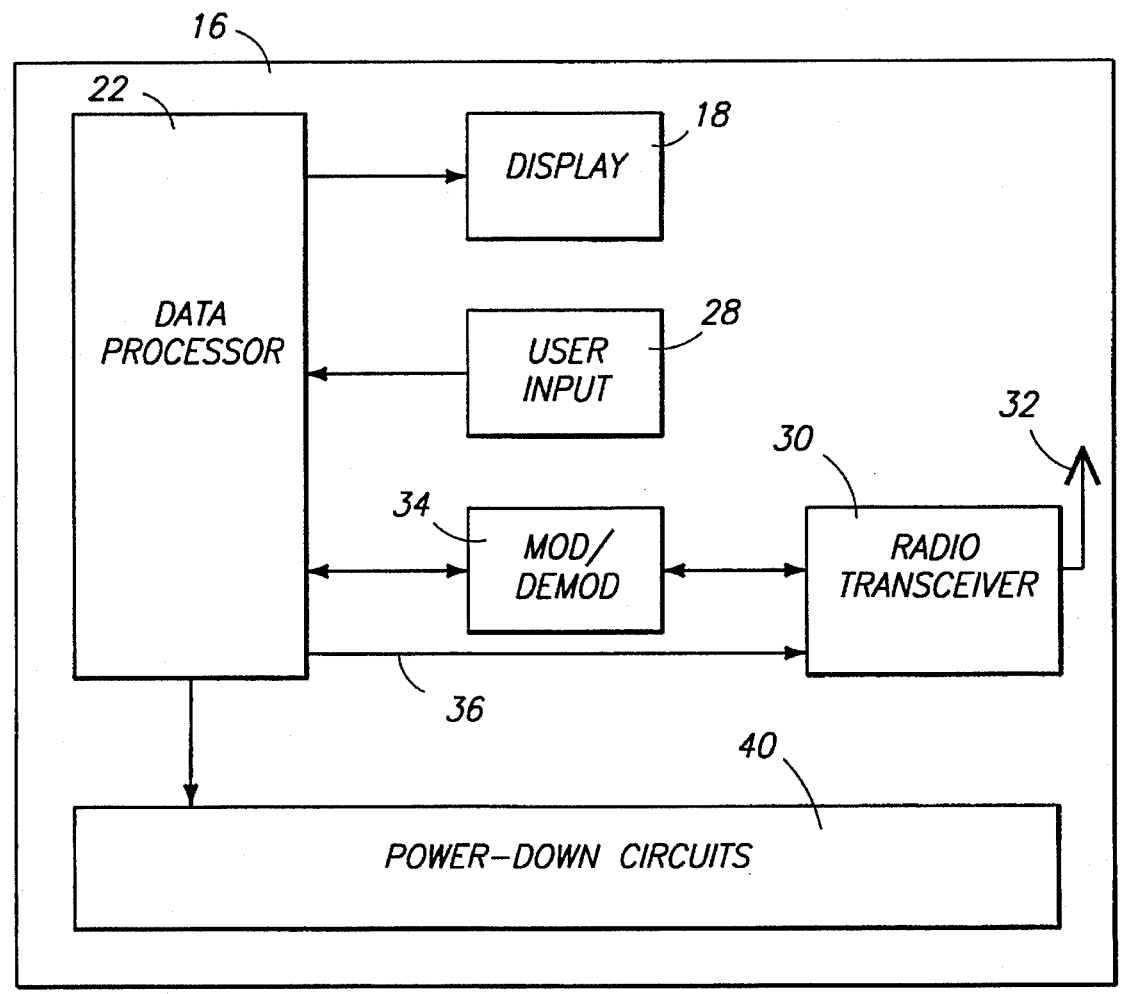

MULTI-CHANNEL PERSONAL MESSAGING UNIT

TECHNICAL FIELD

This invention relates to systems and methods for communicating with personal messaging units.

BACKGROUND OF THE INVENTION

There are various types of wireless communications systems and devices, each with its own advantages and disadvantages. Widely-used paging systems are designed to maximize the battery life of mobile units. They do this by specifying short time slots for communication to specific mobile units. The mobile units can then turn themselves "off" or enter a "sleep" mode between such time slots to conserve battery power. One disadvantage to these types of systems, however, is that they support only very short message lengths. Other types of wireless communications systems are used to implement wide area networks where higher bandwidth is required. These systems support lengthy data transfers, but require that receivers monitor a radio frequency at all times, thus reducing battery life.

It would be desirable for a user of personal wireless communication services to be able to utilize both type of systems, and to retain some or all of the advantages of both. The invention described below provides this capability. Specifically, the invention allows a mobile messaging device having only a single radio transceiver to communicate concurrently with two different types of wireless networks or communication systems.

SUMMARY OF THE INVENTION

The invention is a system and method for communicating between a messaging unit and two different types of communications networks. In the preferred embodiment of the invention to be described below, the system involves a primary wireless digital communications network and a secondary wireless digital communications network. The two networks operate on first and second communication channels, respectively. The communication channels are preferably differentiated from each other by frequency, but might also be differentiated on an alternative basis such as type of signal modulation.

The primary wireless network is of a type which uses a reserved time slot protocol under which transmissions to a particular receiver occur only during discrete or reserved time slots. The secondary wireless network is of a type which uses a continuous downlink protocol under which data transmission to a particular receiver might occur at any time.

The system includes a mobile messaging unit having an internal radio transceiver which is tunable between the first and second channels. The messaging unit further includes channel selection logic which is configured to tune the radio transceiver to the first radio channel during the discrete time slots reserved for communications with the messaging unit, and to the second radio channel during other times. The mobile unit communicates with the primary wireless network when the radio is tuned to the first channel, and with the secondary wireless network when the radio is tuned to the second channel. Any data transmissions from the secondary wireless network which are directed to but missed by the mobile unit during the reserved time slots are retransmitted by the secondary wireless network. Alternatively, the primary and secondary networks communicate with each other, and the secondary network avoids sending data to a mobile unit during the time slots reserved by the primary network for transmission to that mobile unit.

The invention optionally includes power saving features for activating a power conservation mode within the mobile unit during the times between its reserved time slots. The primary wireless network transmits notifications to the mobile unit regarding data which is about to be sent using the secondary wireless network. The mobile unit is responsive to these notifications to override or disable the power conservation mode to allow reception of data from the secondary wireless network.

BRIEF DESCRIPTION OF THE DRAWINGS

FIG. 3 is a block diagram of the exemplary personal data communications device of FIG. 2.

DETAILED DESCRIPTION OF THE PREFERRED EMBODIMENTS

Figure 1:
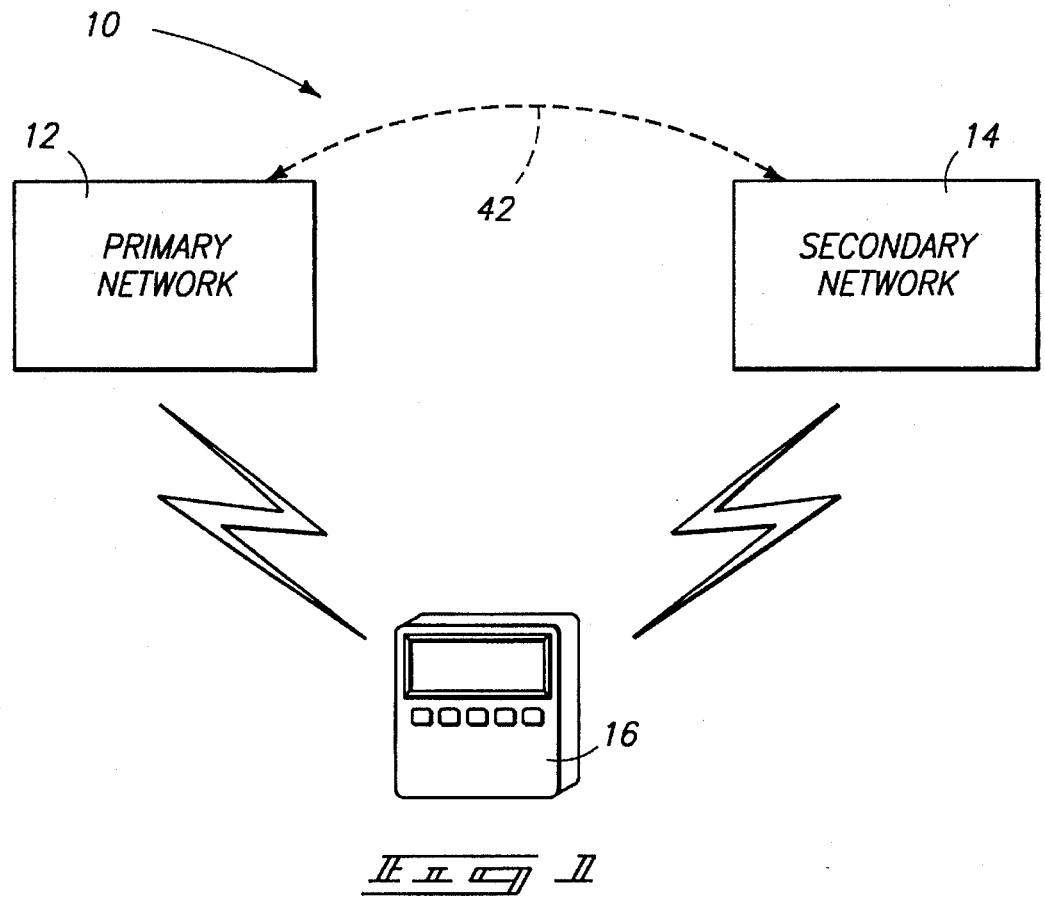
FIG. 1 is a block diagram of a mobile communications system in accordance with a preferred embodiment of the invention.

FIG. 1 shows a mobile communications system 10 in accordance with a preferred embodiment of the invention. System 10 includes a primary wireless digital communications network 12 and a secondary wireless digital communications network 14. These are preferably existing wireless networks, operating under known timing and addressing protocols. Each network operates on its own communications channel. Specifically, primary wireless network 12 operates on a first frequency, radio, or communications channel, and secondary wireless network 14 operates on a second frequency, radio, or communications channel. The networks include one or more fixed stations for transmitting and receiving data. The frequency used for communication with a single network vary according to geographic location in cellular systems.

Primary wireless network 12 is a conventional digital messaging or paging network such as many which are in common use in conjunction with personal pagers. Primary wireless network 12 preferably uses a reserved time slot protocol or fixed reservation scheme for data transmissions to a plurality of individual or personal mobile messaging units or pagers. Under such a protocol or scheme, each receiver is tuned to a common frequency or communications channel (possibly determined by its current geographic location), and there are discrete and predictable time slots specified for data or message transmissions to a particular messaging unit. This allows the messaging unit to enter a powered-down "sleep" mode between the discrete time slots to increase battery life.

There are several common reserved time slot protocols, also referred to as time division multiple access (TDMA) schemes. These protocols allow receivers to predict when to expect or check for a next message transmission, and to power down at other times. POCSAG (Post Office Code Standardisation Advisory Group) is one such protocol, developed in conjunction with the British Post Office, which is in common use by most wireless paging services in the United States. Other, proprietary protocols are also in use, including the FLEX, TAM, and Golay protocols developed or being developed by Motorola Inc., headquartered in Schaumburg, Ill. Additional reserved time slot protocols are being developed for use in conjunction with new generations of personal communications protocols.

Secondary wireless network 14 is a digital data network which uses a continuous or broadcast downlink protocol. Secondary wireless network 14 is preferably a bi-directional network, allowing bi-directional data exchange. Under a continuous communications protocol, receivers are tuned to a common frequency or communications channel (possibly depending on their current geographic locations). Data to a particular receiver might be transmitted at any time, and all receivers are generally required to monitor all transmissions. The preferred continuous downlink protocol is one which requires acknowledgement by the receiver when a data transmission, most often packaged as a data packet, is received. Any unacknowledged data transmission to a particular receiver is automatically re-transmitted.

Various protocols are in use which fall under the description given above for secondary wireless network 14. These protocols are most often used in cellular telephone communications networks, and some are used for implementing wide area networks between different computers. RDLAP (Radio Data Link Access Protocol) is an example of such a protocol. These continuous or broadcast protocols are implemented on two-way wireless WANs (wide area networks) and LANs (local area networks). RAM Mobile Data of Woodbridge, N.J., operates an exemplary wireless WAN. Wireless LANs can be implemented with equipment from Xircom or Proxim, both of Mountain View, Calif.

Mobile communications system 10 includes a plurality of personal data communications devices 16, only one of which is shown in FIG. 1. These devices are preferably packaged as mobile wireless messaging units. They are preferably small enough to be carried in a pocket or on a belt. Personal data communications devices 16 might alternatively be implemented in portable personal computers or some other portable devices.

Figure 2:
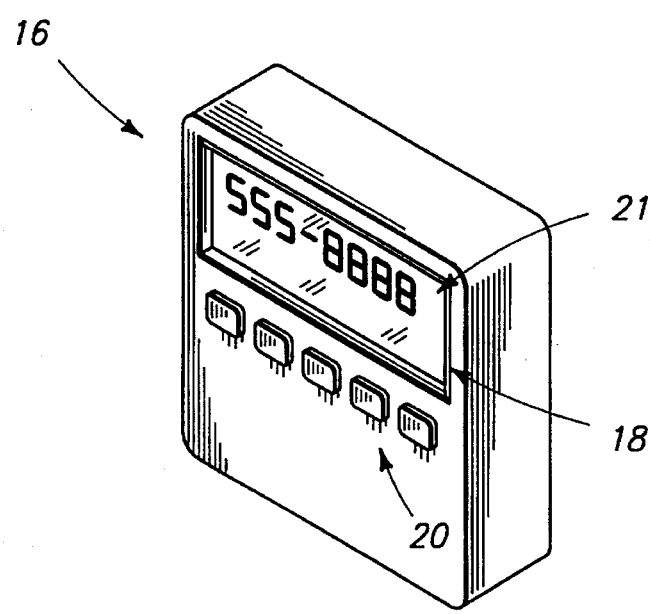
FIG. 2 is an exemplary personal data communications device in accordance with a preferred embodiment of the invention.

An exemplary mobile unit 16 is shown in FIG. 2. It includes a visual data display 18 and a user input device or keypad 20. The user input device also comprises a touch screen 21 implemented in conjunction with visual data display 18. Other forms of user input are also possible. In general, the keys of keypad 20 are included for basic navigational and operational functions. More significant or variable user input takes place through the selection of menu items presented on the visual data display 18 and touch screen 21. The physical form of exemplary mobile unit 16 may of course vary significantly from that shown. In particular, the preferred embodiment of the invention might utilize a larger, bit-mapped graphics display to facilitate a graphical user interface.

FIG. 3 shows mobile unit 16 in a block diagram. Mobile unit 16 includes a data processor 22 which is connected through appropriate interface circuitry (not shown) to communicate with data display 18 and with a user input device 28 which includes a keypad and a touch screen interface. Mobile unit 16 also includes a radio, receiver, or radio transceiver 30. Data processor 22 is operably connected to digitally communicate through radio 30 to external devices or data networks through an antenna 32 which is preferably mounted internally within mobile unit 16. A modulator/demodulator 34 is connected between data processor 22 and the radio transceiver. It is responsive to the radio and to data processor 22 to convert data between the digital format required by data processor 22 and the modulated analog format of radio transmissions. Specifically, modulator/demodulator 34 converts data transmissions received by radio 30 to digital format, and converts data transmissions originating from data processor 22 to a modulated analog format appropriate for radio transmission.

Radio transceiver 30 is alternatively switchable or tunable to the first and second communication channels for data communication with either the primary wireless network 12 or the secondary wireless network 14. Data processor 22 is operatively connected to radio transceiver 30 through a channel selection line 36 to switch radio transceiver 30 to one or the other of the first and second radio channels. For practicality, the first and second radio channels are relatively close to each other or within radio frequency bands which are relatively near each other. For instance, the first radio channel could be at a paging frequency of around 931 MHz, currently allocated to nationwide paging services such as SkyTel of Jackson, Miss., and MobileComm of Ridgeland, Miss., while the second radio channel could be in the 902–928 MHz band which is allocated for ISM (Instrument Scientific Medical) or unlicensed operation. It is contemplated that the recent allocation of NPCS (narrowband personal communication services) frequencies by the FCC (Federal Communications Commission) will result in the availability of paging and two-way wireless data network services in the 901, 930, and 940 Mhz frequency bands, which could be used for primary networks in place of the 931 MHz frequency.

Mobile messaging unit 16 includes channel selection logic, preferably formed by data processor 22, configured to switch radio transceiver 30 to one or the other of the first and second radio channels. More specifically, data processor 22 is programmed to tune transceiver 30 to the first radio channel during the discrete time slots which the primary network uses for data transmissions to mobile unit 16, and to the second radio channel during all other times. Data processor 22 is further programmed to communicate digitally with the primary digital communication network when the radio transceiver is tuned to the first radio channel. In accordance with the reserved time slot protocol used by primary network 12, the channel selection logic programmed in data processor 22 is responsive to data transmissions from the primary digital communication network to determine timing of future reserved time slots.

In many cases, communication with primary network 12 will be unidirectional. However, paging networks planned by providers such as Destineer of Jackson, Miss., will in the future provide bi-directional capabilities using reserved time slot protocols.

Data processor 22 is programmed to digitally communicate and bidirectionally exchange data with the secondary digital communication network when the radio transceiver is tuned to the second radio channel—at all times other than the discrete time slots reserved for communications from primary network 12.

The preferred embodiment of the invention thus performs steps which include digitally transmitting messages on the first radio channel from the primary digital communications network using a reserved time slot protocol, and digitally transmitting data on the second radio channel from the secondary digital communications network using a continuous downlink protocol. Further steps include tuning a radio receiver or transceiver within a particular mobile messaging unit to the first radio channel during discrete or reserved time slots used by the primary digital communications network for data transmissions to the particular mobile messaging unit, and tuning the radio to the second radio channel during times other than the discrete time slots. The invention further includes communicating digitally between the mobile messaging unit and the primary digital communications network when the radio is tuned to the first radio channel, and between the mobile messaging unit and the secondary digital communications network when the radio is tuned to the second radio channel.

The operating characteristics described above allow mobile unit 16 to communicate concurrently with both primary digital communications network 12 and secondary digital communications network 14. For highest efficiency and reliability in communicating with secondary network 14, secondary network 14 should use a continuous protocol which has relatively short periods of activity, and which is tolerant to missed messages. Specifically, the secondary network of the preferred embodiment uses a protocol that re-transmits data which was directed to but not received by a particular mobile messaging unit. Since the discrete time slots during which mobile unit 16 must be tuned to primary network 12 are relatively short, very few data transmissions from secondary network 14 are missed. Those that are missed are re-transmitted until they are acknowledged. Alternatively, the primary and secondary networks are coordinated so that transmissions from the secondary network to a particular mobile unit take place only during the times other than the reserved time slots. This requires communication between the two networks, shown in FIG. 1 by dashed line 42. The necessary communication can be accomplished rather simply in many cases by configuring secondary network 14 to monitor the radio transmissions from primary network 12, and to determine appropriate timing from such data transmissions.

The mobile messaging unit described above efficiently takes advantage of two different types and sources of wireless digital networks, while requiring only a single radio receiver or transceiver. Many different uses for the device are envisioned. For instance, a messaging unit such as that described above might be used to receive conventional paging messages from primary network 12. In this case, data processor 22 is programmed to receive digital paging notifications from primary network 12 and to display such notifications on visual data display 21 to a user of the mobile unit. Secondary network 14 would be used for wide area network communications with other computers, or for communication of lengthy data not appropriate for primary network 12.

Alternatively, one or both of the primary and secondary networks could be based on a peer-to-peer scheme, wherein wireless devices within close proximity of each other could communicate directly with each other. For instance, the primary network could be a conventional centralized paging network for sending paging messages to mobile units, while the secondary network could be a peer-to-peer network for direct communication between portable or fixed wireless devices.

As a further aspect of the invention, mobile messaging unit 16 includes optional aspects for minimizing power consumption and for maximizing battery life. To this end, mobile messaging unit 16 includes power-down control circuitry 40 connected to activate a power conservation mode during times between the discrete time slots when no data transmissions are expected or being received from the secondary digital communication network. Power-down control circuitry 40 is responsive to data processor 22. To determine when data transmissions are to be expected from secondary network 14, data processor 22 monitors data transmissions received from primary network 12. When implementing this aspect of the invention, primary network 12 performs a step of sending a notification to a particular mobile messaging unit that the secondary digital communications network has data which is to be transmitted to the mobile messaging unit. This of course requires coordination between the primary and secondary networks. Such coordination is provided by data link 42 of FIG. 1. Data processor 22 is programmed to activate the power conservation mode between the reserved time slots except after receiving a notification from primary network 12 that secondary digital communications network 14 has data which is to be transmitted to the mobile unit. Stated differently, data processor 22 is programmed to monitor transmissions from secondary network 14 only after receiving a notification from primary network 12.

The invention described above greatly enhances the capabilities of a personal messaging unit without greatly increasing its cost. The invention allows a mobile messaging unit with only a single radio transceiver to communicate concurrently with two different types of wireless networks or communication systems, and to benefit from the advantages of both.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A personal data communications device for concurrently communicating with primary and secondary digital communication networks, the personal data communications device comprising:

a receiver which is alternatively switchable to first and second communications channels, the first communications channel being used by the primary digital communication network in accordance with a reserved time slot protocol having discrete time slots for data transmissions to the personal data communications device, the second communications channel being used by the secondary digital communication network;

channel selection logic connected to the receiver to switch the receiver to the first communications channel during the discrete time slots and to the second communications channel during other times;

a data processor connected to communicate through the receiver with the primary digital communication network when the receiver is switched to the first communications channel and with the secondary digital communication network when the receiver is switched to the second communications channel.

2. A personal data communications device as recited in claim 1 wherein the channel selection logic is responsive to data transmissions from the primary digital communication network to determine timing of the discrete time slots.

3. A personal data communications device as recited in claim 1 wherein the data processor is programmed to communicate digitally with the secondary digital communication network using a continuous downlink protocol under which unacknowledged data transmissions are re-transmitted.

4. A personal data communications device as recited in claim 1 wherein the receiver, channel selection logic, and data processor are contained within a wireless mobile messaging unit which includes a visual data display and a user input device.

5. A personal data communications device as recited in claim 1 and further comprising power-down control circuitry connected to activate a power conservation mode during times between the discrete time slots when no data transmissions are expected from the secondary digital communication network.

6. A personal data communications device as recited in claim 1 and further comprising power-down control circuitry connected to activate a power conservation mode during times between the discrete time slots when no data transmissions are expected from the secondary digital communication network, the power-down control circuitry being responsive to data transmissions received through the receiver from the primary digital communication network to determine when data transmissions are to be expected from the secondary digital communication network.

7. A personal data communications device as recited in claim 1 wherein the data processor is responsive to the receiver to receive notifications through the receiver from the primary digital communication network and to communicate said notifications to a user of the personal data communications device.

8. A personal data communications device as recited in claim 1 and further comprising a visual data display, wherein the data processor is responsive to the receiver to receive digital notifications through the receiver from the primary digital communication network and to display said notifications on the visual data display.

9. A personal data communications device as recited in claim 1 wherein the receiver comprises a transceiver which communicates bi-directionally with the secondary digital communication network when the receiver is switched to the second communications channel to exchange data with the secondary digital communication network using a continuous downlink protocol under which unacknowledged data transmissions are re-transmitted.

10. A personal data communications device as recited in claim 1 and further comprising a demodulator which is responsive to the receiver to convert data transmissions from the primary and secondary digital communication networks to digital format.

11. A personal data communications device for concurrently communicating with primary and secondary digital communication networks, the personal data communications device comprising:
   a radio which is alternatively tunable to first and second communications channels, the first communications channel being used by the primary digital communication network in accordance with a reserved time slot protocol having discrete time slots for data transmissions to the personal communications device, the second communications channel being used by the secondary digital communication network;
   a data processor packaged with the radio as a mobile unit, the data processor being operatively connected to tune the radio to one of the first and second communications channels for data communication through the radio with one of the primary and secondary digital communication networks;
   the data processor being programmed to tune the radio to the first communications channel during the discrete time slots and to tune the radio to the second communications channel during other times;
   the data processor being further programmed to communicate digitally through the radio with the primary digital communication network when the radio is tuned to the first communications channel and with the secondary digital communication network when the radio is tuned to the second communications channel.

12. A personal data communications device as recited in claim 11 wherein the data processor is programmed to communicate with the secondary digital communication network when the radio is tuned to the second communications channel using a continuous downlink protocol under which unacknowledged data transmissions are re-transmitted.

13. A personal data communications device as recited in claim 11 wherein the mobile unit includes a visual data display and a user input device.

14. A personal data communications device as recited in claim 11 and further comprising power-down control circuitry connected to activate a power conservation mode during times between the discrete time slots when no data transmissions are expected from the secondary digital communication network.

15. A personal data communications device as recited in claim 11 and further comprising power-down control circuitry connected to activate a power conservation mode during times between the discrete time slots when no data transmissions are expected from the secondary digital communication network, the power-down control circuitry being responsive to the data processor, the data processor being responsive to data transmissions received through the radio from the primary digital communication network to determine when data transmissions are to be expected from the secondary digital communication network.

16. A personal data communications device as recited in claim 11 wherein the data processor is programmed to receive notifications through the radio from the primary digital communication network and to communicate said notifications to a user of the personal data communications device.

17. A personal data communications device as recited in claim 11 and further comprising a visual data display, the data processor being programmed to receive notifications through the radio from the primary digital communication network and to display said notifications on the visual data display.

18. A personal data communications device as recited in claim 11 wherein the radio comprises a transceiver which communicates bi-directionally with the secondary digital communication network when the radio is tuned to the second communications channel to exchange data with the secondary digital communication network.

19. A personal data communications device as recited in claim 11 and further comprising a visual data display, the data processor being programmed to receive notifications through the radio from the primary digital communication network and to display said notifications on the visual data display, wherein the radio comprises a transceiver which communicates hi-directionally with the secondary digital communication network when the radio is tuned to the second communications channel to exchange data with the secondary digital communication network.

20. A personal data communications device as recited in claim 11 and further comprising a modulator/demodulator connected between the radio and the data processor.

21. A personal data communications device for concurrently communicating with primary and secondary digital communication networks, the personal data communications device comprising:

a wireless mobile messaging unit including a visual data display and a user input device;

the wireless mobile messaging unit containing a radio transceiver which is alternatively tunable to first and second communications channels, the first communications channel being used by the primary digital communication network in accordance with a reserved time slot protocol having discrete time slots for data transmissions to the personal communications device, the second communications channel being used by the secondary digital communication network in accordance with a continuous downlink protocol under which unacknowledged data transmissions are re-transmitted;

the wireless mobile messaging unit further containing a data processor connected to communicate with the data display, the user input device, and the radio transceiver, the data processor being connected to the radio transceiver to tune the radio transceiver to one of the first and second communications channels;

a modulator/demodulator connected between the data processor and the radio transceiver;

the data processor being programmed to tune the radio transceiver to the first communications channel during the discrete time slots and to tune the radio transceiver to the second communications channel during other times;

the data processor being further programmed to communicate digitally through the modulator/demodulator and radio transceiver (a) with the primary digital communication network when the radio transceiver is tuned to the first communications channel and (b) with the secondary digital communication network when the radio transceiver is tuned to the second communications channel.

22. A personal data communications device as recited in claim 21 and further comprising power-down control circuitry connected to activate a power conservation mode during times between the discrete time slots when no data transmissions are expected from the secondary digital communication network.

23. A personal data communications device as recited in claim 21 and further comprising power-down control circuitry connected to activate a power conservation mode during times between the discrete time slots when no data transmissions are expected from the secondary digital communication network, the power-down control circuitry being responsive to the data processor, the data processor being responsive to data transmissions received from the primary digital communication network to determine when data transmissions are to be expected from the secondary digital communication network.

24. A personal data communications device as recited in claim 21 and further comprising a visual data display, the data processor being programmed to receive notifications from the primary digital communication network and to display said notifications on the visual data display.

25. A mobile communications system comprising:

a primary wireless digital communications network which operates on a first communications channel using a reserved time slot protocol;

a secondary wireless digital communications network which operates on a second communications channel;

a wireless mobile messaging unit having a radio which is alternatively tunable to the first and second communications channels, the primary wireless digital communications network having discrete time slots for data transmissions to the wireless mobile messaging unit;

the wireless mobile messaging unit having channel selection logic operatively connected to tune the radio to the first communications channel during the discrete time slots and to the second communications channel during other times to concurrently communicate with both of the primary and secondary digital communication networks.

26. A mobile communications system as recited in claim 25 wherein the channel selection logic is responsive to data transmissions from the primary digital communication network to determine timing of the discrete time slots.

27. A mobile communications system as recited in claim 25 wherein the secondary wireless digital communications network operates on the second communications channel using a continuous downlink protocol under which unacknowledged data transmissions are re-transmitted.

28. A mobile communications system as recited in claim 25 wherein the wireless mobile messaging unit includes a visual data display and a user input device.

29. A mobile communications system as recited in claim 25 and further comprising power-down control circuitry connected to activate a power conservation mode in the wireless mobile messaging unit during times between the discrete time slots when no data transmissions are expected from the secondary digital communication network.

30. A mobile communications system as recited in claim 25 and further comprising power-down control circuitry connected to activate a power conservation mode in the wireless mobile messaging unit during times between the discrete time slots when no data transmissions are expected from the secondary digital communication network, wherein the primary wireless digital communications network sends notifications which allow the power-down control circuitry to determine when to expect data transmissions from the secondary digital communication network.

31. A mobile communications system as recited in claim 25 and further comprising a data processor within the wireless mobile messaging unit which is responsive to the radio to receive notifications through the radio from the primary digital communication network and to communicate said notifications to a user of the wireless mobile messaging unit.

32. A mobile communications system as recited in claim 25, the wireless mobile messaging unit further comprising:

a visual data display;

a data processor which is responsive to the radio to receive digital notifications through the radio from the primary digital communication network and to display said notifications on the visual data display.

33. A mobile communications system as recited in claim 25 wherein the radio comprises a transceiver which communicates bi-directionally with the secondary digital communication network when the radio is tuned to the second communications channel to exchange data with the secondary digital communication network using a continuous downlink protocol under which unacknowledged data transmissions are re-transmitted.

34. A mobile communications system as recited in claim 25 and further comprising a demodulator which is responsive to the radio to convert data transmissions from the primary and secondary digital communication networks to digital format.

35. A mobile communications system comprising:

a primary wireless digital communications network which operates on a first communications channel using a reserved time slot protocol;

a secondary wireless digital communications network which operates on a second communications channel using a continuous downlink protocol under which unacknowledged data transmissions are re-transmitted;

a wireless mobile messaging unit having a radio transceiver which is alternatively tunable to the first and second communications channels, the primary wireless digital communications network having discrete time slots for data transmissions to the wireless mobile messaging unit;

the wireless mobile messaging unit having a data processor operatively connected to tune the radio transceiver to one of the first and second communications channels for data communication through the radio transceiver with one of the primary and secondary digital communication networks;

the data processor being programmed to tune the radio transceiver to the first communications channel during the discrete time slots and to tune the radio transceiver to the second communications channel during other times;

the data processor being further programmed to communicate digitally through the radio transceiver with the primary digital communication network when the radio transceiver is tuned to the first communications channel and with the secondary digital communication network when the radio transceiver is tuned to the second communications channel.

36. A mobile communications system as recited in claim 35 wherein the wireless mobile messaging unit includes a visual data display and a user input device.

37. A mobile communications system as recited in claim 35 and further comprising power-down control circuitry connected to activate a power conservation mode in the wireless mobile messaging unit during times between the discrete time slots when no data transmissions are expected from the secondary digital communication network.

38. A mobile communications system as recited in claim 35 and further comprising power-down control circuitry connected to activate a power conservation mode in the wireless mobile messaging unit during times between the discrete time slots when no data transmissions are expected from the secondary digital communication network, wherein the primary wireless digital communications network sends notifications which allow the power-down control circuitry to determine when to expect data transmissions from the secondary digital communication network.

39. A mobile communications system as recited in claim 35 wherein the data processor is responsive to the radio transceiver to receive notifications through the radio transceiver from the primary digital communication network and to communicate said notifications to a user of the wireless mobile messaging unit.

40. A mobile communications system as recited in claim 35, the wireless mobile messaging unit further comprising a visual data display, the data processor being responsive to the radio transceiver to receive digital notifications through the radio transceiver from the primary digital communication network and to display said notifications on the visual data display.

41. A mobile communications system as recited in claim 35 wherein the radio transceiver communicates bi-directionally with the secondary digital communication network when the radio is tuned to the second communications channel.

42. A mobile communications system as recited in claim 35 and further comprising a demodulator which is responsive to the radio transceiver to convert data transmissions from the primary and secondary digital communication networks to digital format.

43. A method of operating a data communications system which includes a plurality of messaging units, the method comprising the following steps:

digitally transmitting messages on a first communications channel from a primary digital communications network using a reserved time slot protocol;

digitally transmitting data on a second communications channel from a secondary digital communications network using a continuous downlink protocol;

switching a receiver within particular messaging unit to the first communications channel during discrete time slots used by the primary digital communications network for data transmissions to the particular messaging unit;

switching said receiver to the second communications channel during times other than the discrete time slots;

communicating between the particular messaging unit and the primary digital communications network when the receiver is switched to the first communications channel;

communicating between the particular messaging unit and the secondary digital communications network when the receiver is switched to the second communications channel.

44. A method as recited in claim 43 and further comprising re-transmitting data from the secondary digital communications network which was not received by the particular messaging unit.

45. A method as recited in claim 43 and further comprising activating a power conservation mode in the particular messaging unit during times between the discrete time slots when no data is being transmitted to the particular messaging unit from the secondary digital communications network.

46. A method as recited in claim 43 and further comprising sending a notification to the particular messaging unit from the primary digital communications network that the secondary digital communications network has data which is to be transmitted to the particular messaging unit.

47. A method as recited in claim 43 and further comprising:

sending a notification to the particular messaging unit from the primary digital communications network that the secondary digital communications network has data which is to be transmitted to the particular messaging unit;

activating a power conservation mode in the particular messaging unit during times between the discrete time slots except when the particular messaging unit receives a notification that the secondary digital communications network has data which is to be transmitted to the particular messaging unit.

48. A method as recited in claim 43 and further comprising coordinating transmissions to the particular messaging unit from the secondary digital communications network to take place during the times other than the discrete time slots.

49. A method as recited in claim 43 and further comprising coordinating transmissions to the particular messaging unit from the secondary digital communications network to take place during the times other than the discrete time slots, the secondary digital communications network determining the timing of the discrete time slots by receiving data transmissions from the primary digital communications network.

50. A method of operating a wireless data communications system which includes a plurality of mobile messaging units, the method comprising the following steps:

digitally transmitting messages on a first communications channel from a primary digital communications network using a reserved time slot protocol;

digitally transmitting data on a second communications channel from a secondary digital communications network using a continuous downlink protocol;

tuning a radio within a particular mobile messaging unit to the first communications channel during discrete time slots used by the primary digital communications network for data transmissions to the particular mobile messaging unit;

tuning said radio to the second communications channel during times other than the discrete time slots;

communicating between the particular mobile messaging unit and the primary digital communications network when the radio is tuned to the first communications channel;

communicating between the particular mobile messaging unit and the secondary digital communications network when the radio is tuned to the second communications channel.

51. A method as recited in claim 50 and further comprising re-transmitting data from the secondary digital communications network which was not received by the particular mobile messaging unit.

52. A method as recited in claim 50 and further comprising activating a power conservation mode in the particular mobile messaging unit during times between the discrete time slots when no data is being transmitted to the particular mobile messaging unit from the secondary digital communications network.

53. A method as recited in claim 50 and further comprising sending a notification to the particular mobile messaging unit from the primary digital communications network that the secondary digital communications network has data which is to be transmitted to the particular mobile messaging unit.

54. A method as recited in claim 50 and further comprising:

sending a notification to the particular mobile messaging unit from the primary digital communications network that the secondary digital communications network has data which is to be transmitted to the particular mobile messaging unit;

activating a power conservation mode in the particular mobile messaging unit during times between the discrete time slots except when the particular mobile messaging unit receives a notification that the secondary digital communications network has data which is to be transmitted to the particular mobile messaging unit.

55. A method as recited in claim 50 and further comprising coordinating transmissions to the particular mobile messaging unit from the secondary digital communications network to take place during the times other than the discrete time slots.

56. A method as recited in claim 50 and further comprising coordinating transmissions to the particular mobile messaging unit from the secondary digital communications network to take place during the times other than the discrete time slots, the secondary digital communications network determining the timing of the discrete time slots by receiving radio transmissions from the primary digital communications network.

57. A method of operating a wireless data communications system which includes a plurality of mobile messaging units, the method comprising the following steps:

digitally transmitting messages on a first communications channel from a primary digital communications network to the plurality of mobile messaging units using a reserved time slot protocol;

digitally transmitting data on a second communications channel from a secondary digital communications network to the plurality of mobile messaging units using a continuous downlink protocol;

coordinating transmissions to a particular mobile messaging unit from the secondary digital communications network to take place during times other than those discrete time slots used by the primary digital communications network for message transmissions to the particular mobile messaging unit.

58. A method as recited in claim 57 and further comprising:

tuning a radio within the particular mobile messaging unit to the first communications channel during the discrete time slots used by the primary digital communications network for message transmissions to the particular mobile messaging unit;

tuning said radio to the second communications channel during times other than the discrete time slots.

59. A method as recited in claim 57 and further comprising activating a power conservation mode in the particular mobile messaging unit during times between the discrete time slots when no data is being transmitted to the particular mobile messaging unit from the secondary digital communications network.

60. A method as recited in claim 57 and further comprising sending a notification to the particular mobile messaging unit from the primary digital communications network that the secondary digital communications network has data which is to be transmitted to the particular mobile messaging unit.

61. A method as recited in claim 57 and further comprising:

sending a notification to the particular mobile messaging unit from the primary digital communications network that the secondary digital communications network has data which is to be transmitted to the particular mobile messaging unit;

activating a power conservation mode in the particular mobile messaging unit during times between the discrete time slots except when the particular mobile messaging unit receives a notification that the secondary digital communications network has data which is to be transmitted to the particular mobile messaging unit.

* * * * *